(12) United States Patent
Gould et al.

(10) Patent No.: US 11,171,917 B2
(45) Date of Patent: Nov. 9, 2021

(54) SYSTEMS AND METHODS FOR DOMAIN NAME SYSTEM PROMOTION AND REDEMPTION

(71) Applicant: VERISIGN, INC., Reston, VA (US)

(72) Inventors: James Gould, Leesburg, VA (US); Karthik Shyamsunder, Winchester, VA (US)

(73) Assignee: VERISIGN, INC., Reston, VA (US)

( * ) Notice: Subject to any disclaimer, the term of this patent is extended or adjusted under 35 U.S.C. 154(b) by 566 days.

(21) Appl. No.: 15/800,557

(22) Filed: Nov. 1, 2017

(65) Prior Publication Data
US 2019/0132284 A1    May 2, 2019

(51) Int. Cl.
| | |
|---|---|
| *G06Q 30/00* | (2012.01) |
| *H04L 29/12* | (2006.01) |
| *G06Q 30/06* | (2012.01) |
| *G06Q 30/02* | (2012.01) |
| *H04L 29/06* | (2006.01) |

(52) U.S. Cl.
CPC ..... *H04L 61/3025* (2013.01); *G06Q 30/0207* (2013.01); *G06Q 30/0609* (2013.01); *G06Q 30/0623* (2013.01); *H04L 61/1511* (2013.01); *H04L 63/1483* (2013.01)

(58) Field of Classification Search
CPC ............ H04L 61/3025; H04L 61/1511; H04L 63/1483; G06Q 30/0207; G06Q 30/0609; G06Q 30/0623
See application file for complete search history.

(56) References Cited

U.S. PATENT DOCUMENTS

| | | | |
|---|---|---|---|
| 2002/0161745 A1* | 10/2002 | Call | H04L 61/157 |
| 2007/0067465 A1* | 3/2007 | Blinn | H04L 41/0893 709/229 |
| 2007/0118669 A1* | 5/2007 | Rand | H04L 61/1511 709/245 |
| 2010/0100946 A1* | 4/2010 | Hallam-Baker | H04L 63/06 726/5 |

(Continued)

OTHER PUBLICATIONS

STIC EIC 3600 Search Report for U.S. Appl. No. 15/800,557 dated Mar. 26, 2020 (Year: 2020).*

(Continued)

*Primary Examiner* — Matthew T Sittner
(74) *Attorney, Agent, or Firm* — MH2 Technology Law Group, LLP

(57) ABSTRACT

A method of providing domain name system ("DNS") eligibility is provided. The method includes obtaining, at an eligibility service comprising at least one electronic server computer communicatively coupled to a computer network, a request of an eligibility proof from a DNS client; validating, by the eligibility service, the request; providing, by the eligibility service, the eligibility proof to the DNS client; obtaining, by the eligibility service, the eligibility proof, wherein the eligibility proof is related to a registration of a domain name by the DNS client with a DNS registry; validating, by the eligibility service, the eligibility proof; applying, by the eligibility service, a promotion credit to an account of the DNS client; and providing, by the eligibility service, a confirmation of the promotion credit to the DNS client.

20 Claims, 9 Drawing Sheets

(56) References Cited

U.S. PATENT DOCUMENTS

| | | | | |
|---|---|---|---|---|
| 2010/0325723 | A1* | 12/2010 | Essawi | H04L 9/3234 726/20 |
| 2011/0047292 | A1* | 2/2011 | Gould | H04L 61/302 709/242 |
| 2012/0017259 | A1* | 1/2012 | MacCarthaigh | H04L 29/12066 726/1 |
| 2012/0173681 | A1* | 7/2012 | Gould | H04L 61/1511 709/221 |
| 2012/0173685 | A1* | 7/2012 | Shorter | H04L 29/12066 709/223 |
| 2012/0174198 | A1* | 7/2012 | Gould | G06F 21/335 726/6 |
| 2012/0278626 | A1* | 11/2012 | Smith | H04L 63/123 713/176 |
| 2013/0173701 | A1* | 7/2013 | Goyal | H04L 61/302 709/204 |
| 2013/0185130 | A1 | 7/2013 | Custer | |
| 2013/0198410 | A1* | 8/2013 | Gould | H04L 29/12632 709/238 |
| 2014/0036897 | A1* | 2/2014 | Frydman | H04W 40/00 370/338 |
| 2014/0123301 | A1* | 5/2014 | Kaliski, Jr. | G06F 21/6263 726/26 |
| 2015/0379579 | A1* | 12/2015 | Chiang | G06Q 30/0267 705/14.64 |
| 2016/0191243 | A1* | 6/2016 | Manning | H04L 9/321 713/168 |
| 2016/0205106 | A1* | 7/2016 | Yacoub | H04W 12/04033 726/28 |
| 2017/0178193 | A1* | 6/2017 | Jagannath | G06Q 30/0273 |
| 2017/0187673 | A1* | 6/2017 | Kaliski, Jr. | H04L 63/0807 |
| 2018/0062856 | A1* | 3/2018 | Kaliski, Jr. | H04L 9/3247 |
| 2018/0063141 | A1* | 3/2018 | Kaliski, Jr. | H04L 61/302 |
| 2019/0132280 | A1* | 5/2019 | Meuninck | H04L 63/0272 |
| 2019/0132284 | A1* | 5/2019 | Gould | G06Q 30/0207 |

OTHER PUBLICATIONS

IP.com search strategy dated Jun. 28, 2021 (Year: 2021).*
Hollenbeck et al., Network Solutions Setal: "NSI Registry Registrar Protocol (RRP) Version 1.1.0; rfc2832.txt", Internet Engineering Task Force, IETF; Standard, Internet Society (ISOC) 4, Rue Des Falaises CH-1205 Geneva, Switzerland, May 1, 2000, XP015008615, pp. 1-40.
Hollenbeck et al., "Extensible Provisioning Protocol (EPP) Domain Name Mapping; rfc5731.txt", Internet Engineering Task Force, IETF; Standard, Internet Society (ISOC) 4, Rue Des Falaises CH-1205 Geneva, Switzerland, Aug. 1, 2009, XP015065666, pp. 1-44.
Extended European Search Report issued in corresponding European Patent Application No. 18203616.0 dated May 16, 2019, pp. 1-9.

* cited by examiner

SYSTEMS AND METHODS FOR DOMAIN NAME SYSTEM PROMOTION AND REDEMPTION

FIELD

The present disclosure relates generally to domain name system ("DNS") promotion and redemption.

BACKGROUND

The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources including web pages using names.

The DNS uses "resource records", which are persistently stored, formatted data structures that include information relevant to performing DNS tasks. For example, IP addresses are specified by DNS "A" or "AAAA" resource records, which include both a domain name and the associated IP address for the computer server that hosts the domain, i.e., the web hosting provider.

A DNS "registry" is an authoritative, master database of all domain names registered in a top-level domain or other domain in which domain names can be registered. A registry includes many hardware computer servers operably coupled to the internet. A registry keeps the master database and also generates a "zone file" comprising DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

Domain names can be registered by internet users known as "registrants" through many different companies known as "registrars". Registrars compete with one another to register domain names for registrants. That is, an internet user interacts with a registrar to obtain a domain name, thereby becoming a registrant for the domain. The registrar chosen by the registrant asks the registrant to provide various contact and technical information that makes up the registration. The registrar then keeps a record of the contact information and submits the technical information to the registry. For ease of discussion, a registrar is identified with its hardware computer servers unless otherwise specified or clear from context. Further, an internet user has a hardware client computer. For ease of discussion, a registrant is identified with its hardware client computer unless otherwise specified or clear form context.

SUMMARY

In accordance with examples of the present disclosure, a method of providing domain name system ("DNS") eligibility is provided. The method comprises obtaining, at an eligibility service comprising at least one electronic server computer communicatively coupled to a computer network, a request of an eligibility proof from a DNS client; validating, by the eligibility service, the request; providing, by the eligibility service, the eligibility proof to the DNS client; obtaining, by the eligibility service, the eligibility proof, wherein the eligibility proof is related to a registration of a domain name by the DNS client with a DNS registry; validating, by the eligibility service, the eligibility proof; applying, by the eligibility service, a promotion credit to an account of the DNS client; and providing, by the eligibility service, a confirmation of the promotion credit to the DNS client. In some examples, obtaining the eligibility proof further comprises obtaining an identifier related to the registration of the domain name. In some examples, the method further comprises validating the identifier. In some examples, the identifier related to registration of the domain name is a unique server transaction identifier created by the DNS registry. In some examples, the eligibility proof comprises a code, a token, or a coupon. In some examples, the eligibility proof is pre-generated and associated with a domain name registration promotion. In some examples, the DNS client comprises a DNS registrar, DNS registrant, a DNS reseller, a n-tier DNS reseller, or a DNS reseller customer. In some examples, the eligibility service comprises a service provided by a DNS registry or a domain name suggestion provider.

In accordance with examples of the present disclosure, a non-transitory computer readable medium is provided that is configured to store instructions that when executed by an electronic processor configured to perform a method of providing domain name system ("DNS") eligibility comprising: obtaining a request of an eligibility proof from a DNS client; validating the request; providing the eligibility proof to the DNS client; obtaining the eligibility proof, wherein the eligibility proof is related to a registration of a domain name by the DNS client with a DNS registry; validating the eligibility proof; applying a promotion credit to an account of the DNS client; and providing a confirmation of the promotion credit to the DNS client.

In accordance with examples of the present disclosure, an eligibility computer system is provided. The eligibility computer system comprises an electronic processor; a non-transitory computer readable medium configured to store instructions that when executed by the electronic processor performs a method of providing domain name system ("DNS") eligibility comprising: obtaining a request of an eligibility proof from a DNS client; validating the request; providing the eligibility proof to the DNS client; obtaining the eligibility proof, wherein the eligibility proof is related to a registration of a domain name by the DNS client with a DNS registry; validating the eligibility proof; applying a promotion credit to an account of the DNS client; and providing a confirmation of the promotion credit to the DNS client.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
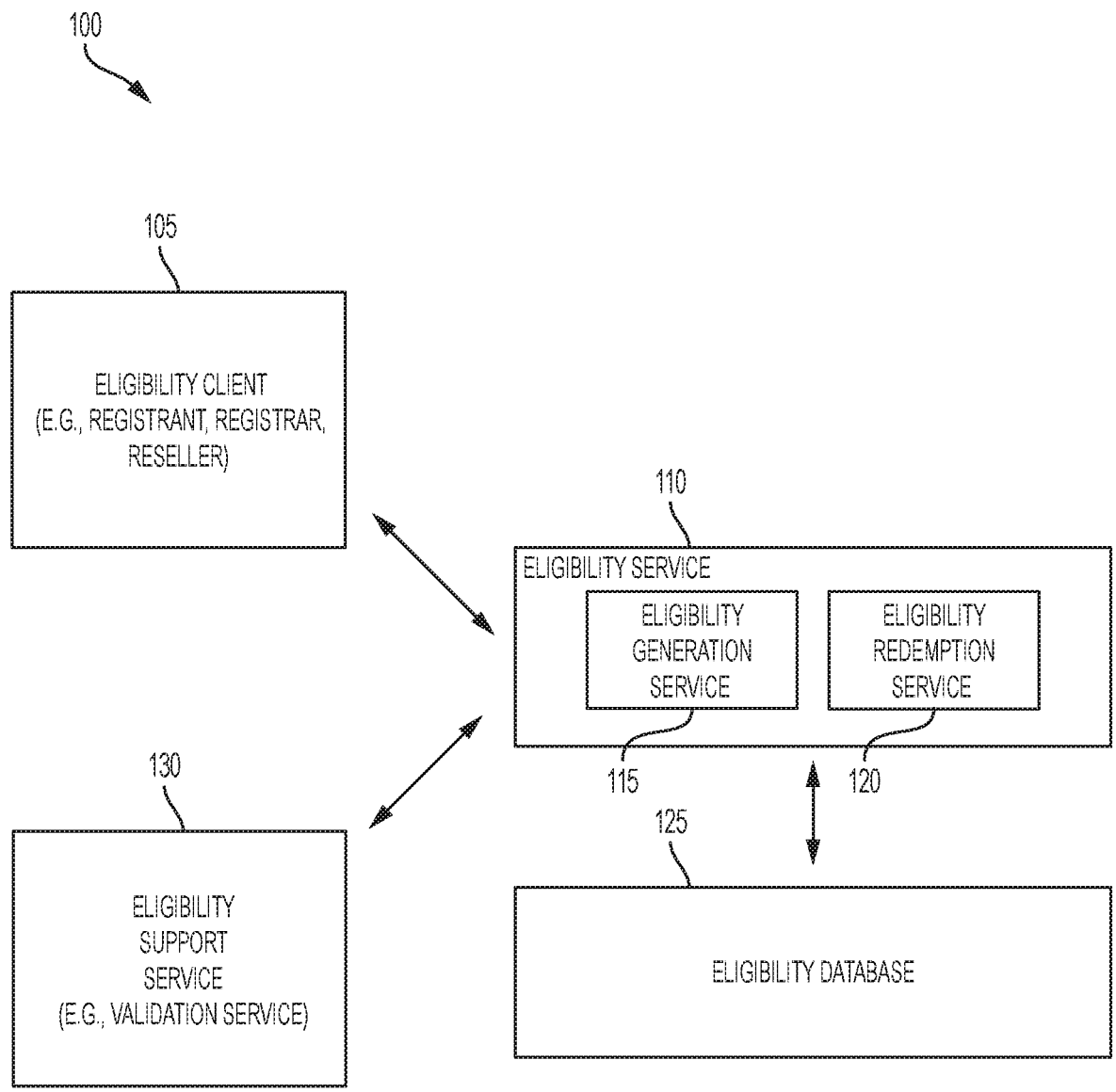
FIG. 1 shows a diagram of eligibility system 100, according to examples of the present disclosure.

FIG. 1 shows a diagram of eligibility system 100, according to examples of the present disclosure. Eligibility client 105, e.g., a registrant, a registrar, a reseller, etc., communicates over a network (not shown) with eligibility service 110. Eligibility service 110 includes eligibility generation service 115 and eligibility redemption service 120 and is in communication with eligibility database 125. Eligibility service 110 is also in communication with eligibility support service 130, e.g., a validation service. In some examples, eligibility service 110 can be a service provided by a DNS registry or by a third party.

For example, eligibility service 110 can provide for eligibility for a DNS-related service, such as a domain registration service. The eligibility can be associated with a promotion for domain registration. Eligibility client 105 can provide proof of eligibility for a promotion to eligibility service 110 and/or to an eligibility support service 130. The proof of eligibility can be in the form of a proof element, such as a token or code in the form of a server transaction identifier. In one example, the proof of eligibility can be a coupon. For example, eligibility client 105 in the form of a registrar can provide proof of an action, such as a domain creation operation, a domain creation operation of a certain domain type, or completion of a certain operation, that the registrar previously took using information received from eligibility service 110 and/or information that the registrar has at hand. In another example, eligibility client 105 in the form of a registrar may need to obtain a domain name to be registered from a domain name suggestion service and obtain proof, e.g., a verification code, of that action in order to be eligible for a particular promotion. Once the domain name is registered, eligibility client 105 can receive verification, e.g., server transaction identifier, of the registration from a registry. Eligibility client 105 can provide the proof of the domain name suggestion service and/or the proof of the registration to eligibility service 110 to obtain benefits, e.g., discounts, credits, additional services, of the promotion. Eligibility service 110 verifies eligibility through interfacing with one or more eligibility support service 130, e.g., a DNS registry or a name suggestion service. Eligibility support service 130 provides the ability to verify the proof provided by eligibility client 105 is valid for actions from services such as domain name suggestion, domain name registration, etc.

As one non-limiting example, eligibility can be in the form of promotions that can come in the form of generated or derived coupons that apply credits to the account redeeming the coupon. Promotions can be based on identifiers from one or more services that may include registries, value added services like name suggestion, or the coupon service itself. Promotions can be generated via an API, a UI, or via a batch interface. The coupon redemption can be handled in a variety of ways. First, an API (e.g., REST, EPP) can be created for coupon creation and coupon redemption that can be used by registrars and other business-to-business parties like resellers to satisfy the policies for different promotions. The examples shown in FIGS. 2-7 are associated with use of an API. Second, clients can provide the required proof of eligible transactions for the promotions via a batch interface (e.g., FTP, SCP, transferred file via e-mail or Web UI) for processing the credits in batch. Third, in place of having the clients directly pass data either via an API or a batch interface, the coupon promotion service can apply credits based on data residing in the services associated with the promotion including the domain registries and name suggestion, which is not explicit credits but credits based on heuristics or server-side evidence.

In some examples, promotions can be designed around a set of services and service products, where a service relates to a system like a DNS registry or name suggestion service, and a service product is typically a top-level domain (TLD). An example is a promotion for the ".COM" and ".NET" products on the DNS service. Another example is the .COM product on the DNS service along with the name suggestion service. A set of service product classifications can include, but are not limited to, domain names of a certain length, domain names registered with specific registration periods, domain name type (e.g., ASCII or IDN), domain name fee type (e.g., standard or premium), and domain name bundles (e.g., "example" label registered across multiple TLDs or domain name variants registered if supported).

In some examples, the type of coupon used, can include, but are not limited to a coupon allocation pool, pre-generated coupon, derived coupon, a set of target clients for the promotion, promotion duration or expiry, and a promotion credit amount. The coupon allocation pool is a pool of available coupons defined for the clients that can be retrieved and then redeemed. The promotion can define the coupon allocations available to a defined set of clients. This type of coupon applies to the registrar marketing promotion described in FIG. 2, reseller marketing promotion described in FIG. 3, and name suggestion reseller conversion with coupon described in FIG. 7. The pre-generated coupon is a set of coupons generated to be distributed to clients for redemption. The coupons can be physical or digital and they may or may not be used. The Promotion Administrator will determine the number of coupons to pre-generate and how to distribute the coupons to the clients. This type of coupon applies to the registrant coupon redemption described in FIG. 4. The derived coupon is a coupon that is not generated ahead of time but is created dynamically based on receiving the required promotion inputs. A coupon is not pre-generated or passed by the client for redemption, but is derived based on the promotion inputs. This type of coupon applies to the name suggestion registrar conversion described in FIG. 5 and the name suggestion reseller conversion with TransId described in FIG. 6. For the set of target clients for the promotion, a promotion can be for an individual client, for a group of clients (e.g., based on geographic location), for clients of a certain type (e.g., registrar, reseller, registrant), or for all clients.

In some examples, the various methods described herein can use a third party verification to provide additional eligibility proof in addition to or in alternative to a transaction identifier or providing the coupon. For example, with the registrant coupon redemption described in FIG. 4, coupons may be provided to college students, where to redeem a coupon, proof of being a student may be required by a trusted third party. The eligibility token can be generated by a trusted third party and passed upon redemption.

Figure 2:
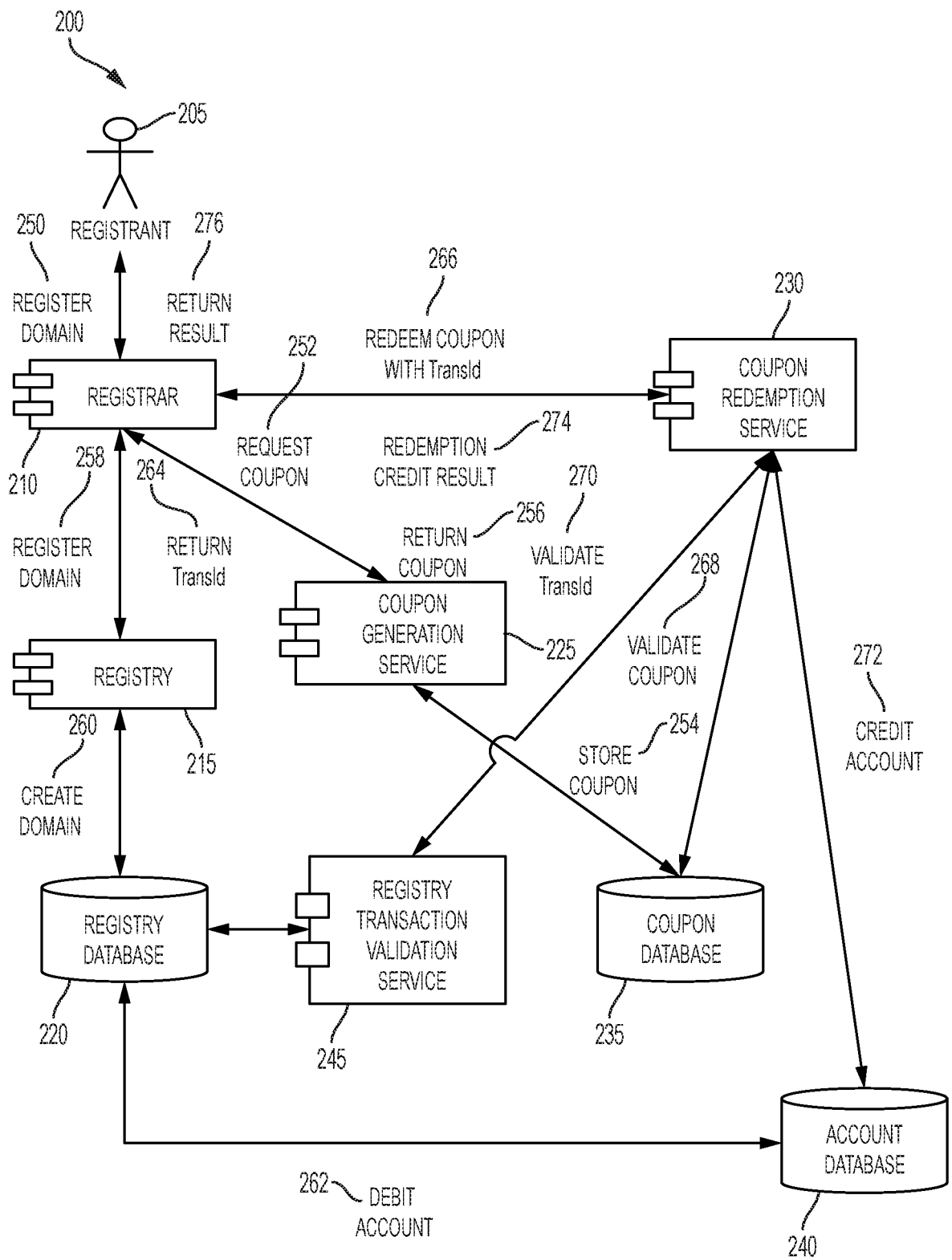
FIG. 2 shows a hybrid diagram 200 for a registrar marketing promotion method, according to examples of the present disclosure.

FIG. 2 shows a hybrid diagram 200 for a registrar marketing promotion method, according to examples of the present disclosure. The registrar marketing promotion method of FIG. 2 provides for a specific registrar promotion that could be associated with many different scenarios (e.g., set of TLD's, set of billable operations, set of billable operation periods, domain name type like IDN or non-IDN). In FIG. 2, it is assumed that the promotion has already been pre-configured into the coupon promotion service and the method describes how marketing coupons are generated and redeemed. In the method of FIG. 2, all debits and credits are applied to the registrar's account.

Although not shown in FIG. 2, a coupon promotion service can be provided on a common server platform and can include both coupon generation service 225 and coupon redemption service 230, and which is in communication with coupon database 235. In FIG. 2, coupon generation service 225, coupon redemption service 230, and coupon database 235 are shown as distinct elements merely to highlight the various operations performed by each service.

Registrant 205 submits, at 250, the registration of a domain name to registrar 210. Registrar 210 requests, at 252, for a coupon from coupon generation service 225. Coupon generation service 225 comprises a specific service API of the coupon promotion service for requesting, generating, and returning coupons for use in redemption. In some examples, each coupon promotion can have a unique handle that is referenced when requesting a coupon. Coupon generation service 225 validates the coupon request, which may be based on a fixed number of coupons defined per registrar, will generate the coupon and will store, at 254, the coupon in coupon database 235. Coupon database 235 is a data source that stores the promotions, the generated coupons, and coupon redemption information. In some examples, there is an expiry date/time for the coupon to be redeemed by registrar 210. The coupon is returned, at 256, to registrar 210 by coupon generation service 225 for use in coupon redemption. Registrar 210 submits, at 258, the domain name registration (e.g., Domain Create Command, as depicted in RFC 5731) to domain registry 215. Domain registry 215 creates the domain name in registry database 220. A unique server transaction identifier is generated and stored for later use. Domain registry 215 debits the account for registrar 210 for the registration. Domain registry 215 returns, at 264, the registration response with a unique server transaction identifier (TransID) to registrar 210. Registrar 210 will hold the server transaction identifier for use in coupon redemption. Registrar 210 submits, at 266, the coupon and the registration server transaction identifier to coupon redemption service 230 to receive the coupon credit. Coupon redemption service 230 comprises a specific API of the coupon promotion service for redemption of coupon credits. In some examples, this submission is not a synchronous call, meaning that a coupon redemption request will be submitted and registrar 210 will receive notification of the result. For simplicity, FIG. 2 shows it as a synchronous action. Coupon redemption service 230 validates, at 268, the coupon by verifying that all of the coupon settings apply (e.g., Registrar, TLD, expiry). Coupon redemption service 230 validates, at 270, the server transaction identifier by verifying that the server transaction identifier exists and the information associated with the transaction matches the promotion by interfacing with registry transaction validation service 245. Registry transaction validation service 245 comprises a service API provided by domain registry 215 to validate a server transaction identifier and to provide information back associated with it. Registry transaction validation service 245 only validates the existence of the transaction and provides back transaction information to coupon redemption service 230 for comparison to the promotion. Coupon redemption service 230 applies, at 272, the promotion credit to the account of registrar 210 in account database 240. In some examples, this may include updating the status of the coupon in coupon database 235 to reflect that it has been redeemed. Coupon redemption service 230 returns, at 274, the result of the coupon redemption to registrar 210, which may include the information like the result code (e.g., success, failure), the credit amount applied, and the date and time the credit was applied. Registrar 210 returns, at 276, the result to registrant 205.

Figure 3:
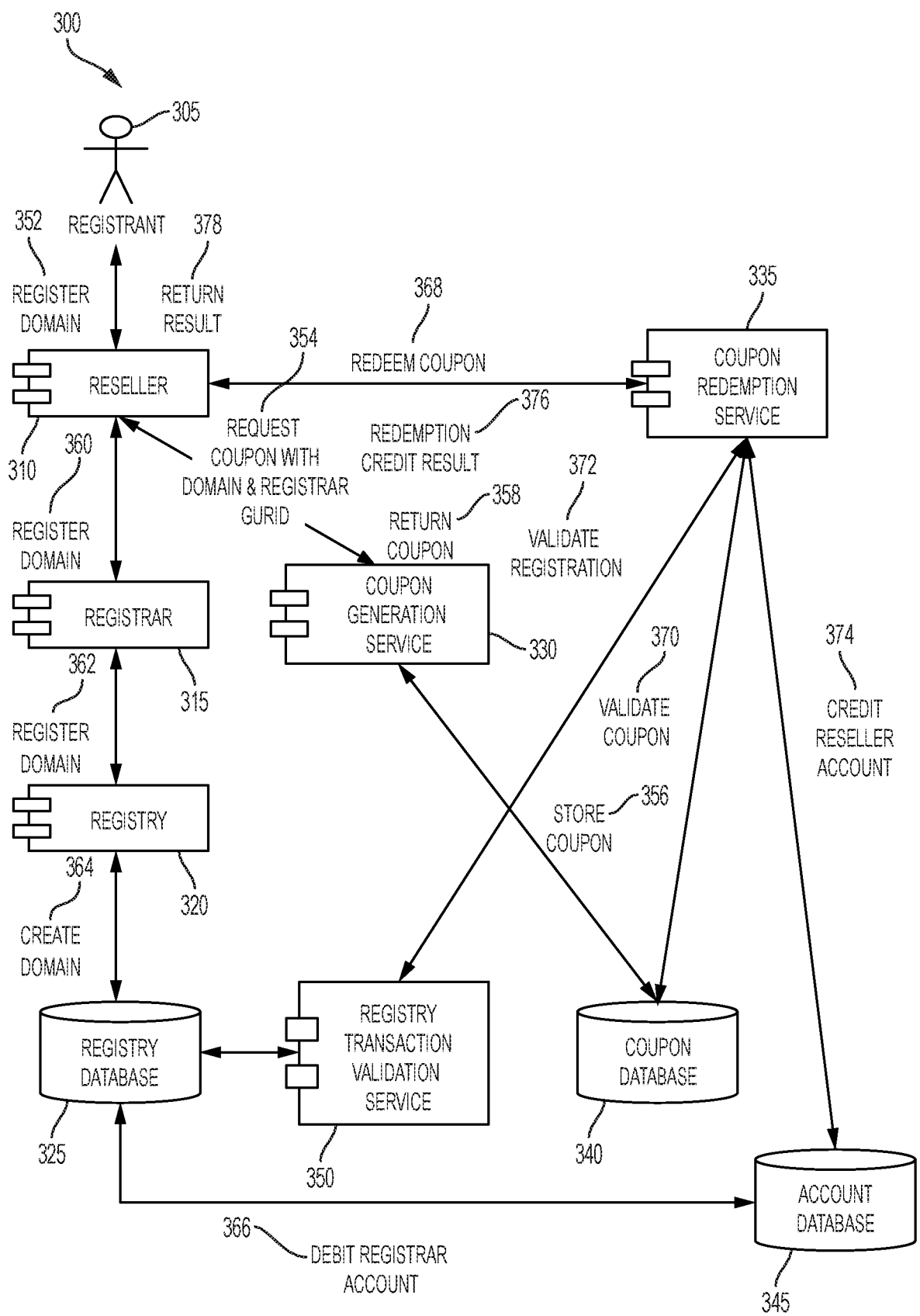
FIG. 3 shows a hybrid diagram 300 for a reseller marketing promotion method, according to examples of the present disclosure.

FIG. 3 shows a hybrid diagram 300 for a reseller marketing promotion method, according to examples of the present disclosure. The reseller marketing promotion method defines a specific promotion that could be associated with many different scenarios (e.g., set of TLD's, set of billable operations, set of billable operation periods, domain name type like IDN or non-IDN) that can be redeemed by resellers. In FIG. 3, it is assumed that the promotion has already been pre-configured into the coupon promotion service and the method describes how marketing coupons are generated and redeemed by resellers. In the method of FIG. 3, the registration debits are applied to the registrar's account and the promotion credit is applied to the reseller's account.

Although not shown in FIG. 3, a coupon promotion service can be provided on a common server platform and can include both coupon generation service 330 and coupon redemption service 335, and which is in communication with coupon database 340. In FIG. 3, coupon generation service 330, coupon redemption service 335, and coupon database 340 are shown as distinct elements merely to highlight the various operations performed by each service.

Registrant 305 submits, at 352, the registration of a domain name to reseller 310. Because the reseller 310 has an account with the registry for coupons, the reseller 310 can perform the registration through the registrar 315 for reseller 310 and receive the credit directly from the registry 320. Reseller 310 requests, at 354, for a coupon from coupon generation service 330 passing in the domain name and unique identifier, e.g. the Global Unique Registrar Identifier (GURID), of registrar 315 that will be used. Coupon generation service 330 comprises a specific service API of the coupon promotion service for requesting, generating, and returning coupons for use in redemption. In some examples, each coupon promotion will have a unique handle that is referenced when requesting a coupon. Coupon generation service 330 validates, at 356, the coupon request, which may be based on a fixed number of coupons defined per reseller 310, generates the coupon and stores the coupon in coupon database 340. Coupon database 340 is a data source that stores the promotions, the generated coupons, and coupon redemption information. In some examples, an expiry date/time is included for the coupon to be redeemed by reseller 310. The coupon, at 358, is returned to reseller 310 by coupon generation service 330 for use in coupon redemption. Reseller 310 submits, at 360, the domain name registration matching the domain name in 354 to registrar 315 with the matching GURID in 354. Registrar 315 submits, at 362, the domain name registration (e.g., Domain Create Command in RFC 5731) to registry 320. Domain registry 320 creates, at 364, the domain name in registry database 325. Domain registry 320 debits, at 366, the account for registrar 315 for the registration from account database 345. Reseller 310 submits, at 368, the coupon to coupon redemption service 335 to receive the coupon credit. In some examples, this is not a synchronous call, meaning that a coupon redemption request will be submitted and reseller 310 will receive notification of the result. For simplicity, FIG. 3 shows it as a synchronous action. Coupon redemption service 335 comprises a specific API of the coupon promotion service for redemption of coupon credits. Coupon redemption service 335 validates, at 370, the coupon by verifying that all of the coupon settings apply (Reseller, TLD, domain name, expiry). Coupon redemption service 335 validates, at 372, the registration and validates the information associated with the transaction matches the coupon (domain name, registrar GURID, coupon created prior to the registration) by interfacing with registry transaction validation service 350. Registry transaction validation service 350 comprises a service API provided by domain registry 320 to validate a registration (or any transaction) and to provide information back associated with it. Registry transaction validation service 350 only validates the existence of the transaction and provides back transaction information to coupon redemption service 335 for comparison to the coupon. Coupon redemption service 335 applies, at 374, the promotion credit to the account of reseller 310 in account database 345. This may include updating the status of the coupon in coupon database 340 to reflect that it has been redeemed. Coupon redemption service 335 returns, at 376, the result of the coupon redemption to reseller 310, which may include the information like the result code (success, failure), the credit amount applied, and the date and time the credit was applied. Reseller 310 returns, 378, the result to registrant 305.

In some examples, the credit may not be applied or may be delayed in all cases when the redemption grace period is in effect for an operation. For example, the registrar of FIG. 2 or the reseller marketing promotion of FIG. 3 may be required to redeem the credit after the 5-day add grace period or the coupon redemption service may delay the credit until after the 5 day add grace period has passed.

Figure 4:
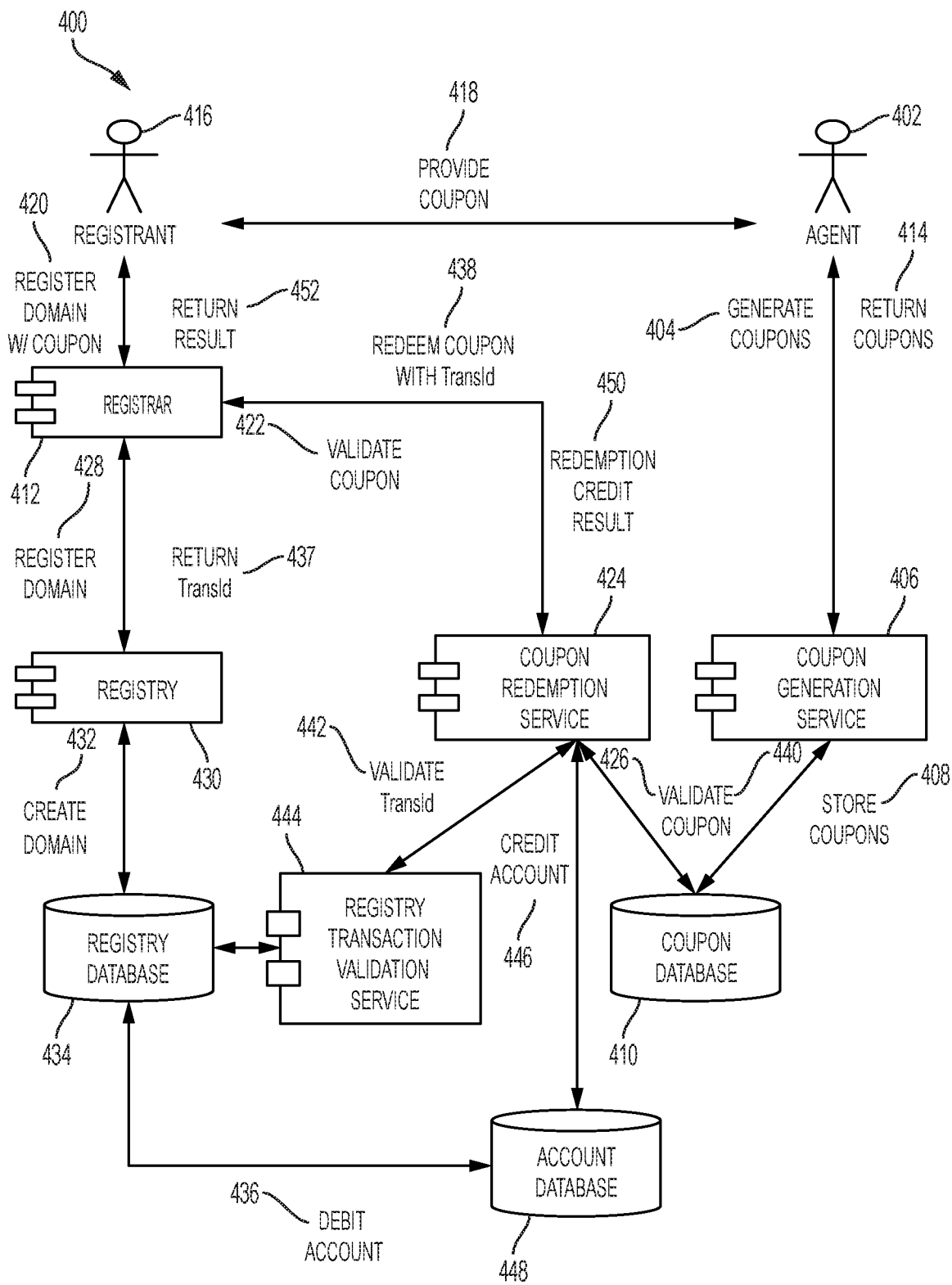
FIG. 4 shows a hybrid diagram 400 for a registrant coupon redemption method, according to examples of the present disclosure.

FIG. 4 shows a hybrid diagram 400 for a registrant coupon redemption method, according to examples of the present disclosure. The registrant coupon redemption method defines a specific registrant promotion that can be associated with the registration of domain names by many different scenarios (e.g., set of TLD's, set of registration periods, domain name type like IDN or non-IDN). One example registrant promotion is to generate free domain name registration to college students via coupons provided electronically or by hand. In the method of FIG. 4, it is assumed that the promotion has already been pre-configured into the coupon promotion service and the method describes how registrant coupons are generated and redeemed. In the method of FIG. 4, all debits and credits are applied to the registrar's account that should be passed directly onto the registrant by contract.

Although not shown in FIG. 4, a coupon promotion service can be provided on a common server platform and can include both coupon generation service 406 and coupon redemption service 424, and which is in communication with coupon database 410. In FIG. 4, coupon generation service 406, coupon redemption service 424, and coupon database 410 are shown as distinct elements merely to highlight the various operations performed by each service.

Agent 402, e.g., a registry such as Verisign or an authorized third party representative, requests, 404, coupon generation service 406 to generate a set of coupons associated with a promotion. Coupon generation service 406 comprises a specific service API of the coupon promotion service for generating and returning coupons for use in redemption. The coupons are generated and stored, at 408, in coupon database 410. Coupon database 410 is a data source that stores the promotions, the generated coupons, and coupon redemption information. A coupon may have a description, an identifier, an expiry, and a set of participating registrars, e.g., registrar 412, for redemption. The coupons are returned, at 414, to agent 402 for distribution to prospective registrants, e.g., registrant 416. Agent 402 provides, at 418, registrant 416 with a coupon that can be redeemed at a participating registrar, e.g. registrar 412. Registrant 416 requests, at 420, to register a domain name with a participating registrar, e.g., registrar 412, with the coupon. In some examples, a participating registrar could enable the registrant to enter the coupon's identifier during the registration flow.

Registrar 412 validates the coupon with the coupon redemption service 424. Registrar 412 passes, at 422, the coupon (e.g., coupon identifier) to coupon redemption service 424 for existence and promotion applicability to the registration properties (e.g., domain name, registration period). Coupon redemption service 424 comprises a specific API of the coupon promotion service for redemption of coupon credits. Coupon redemption service 424 queries, at 426, coupon database 410 for the coupon and promotion information to determine whether it exists and is applicable. The validation result is returned to registrar 412 along with other information like the expiry of the coupon.

Registrar 412 interacts with the domain registry 430. Registrar 412 submits, at 428, the domain name registration (e.g., Domain Create Command as depicted in RFC 5731) to domain registry 430. Domain registry 430 creates, at 432, the domain name in registry database 434. Domain registry 430 debits, at 436, the account of registrar 412 with account database 448. A unique server transaction identifier is generated and stored for later use. Domain registry 430 returns, at 437, the registration response with a unique server transaction identifier to registrar 412. Registrar 412 will hold the server transaction identifier for use in coupon redemption. Registrar 412 interacts with coupon redemption service 424. Registrar 412 submits, at 438, the coupon and the registration server transaction identifier to coupon redemption service 424 to receive the coupon credit. In some examples, this may not be a synchronous call, meaning that a coupon redemption request will be submitted and registrar 412 will receive notification of the result. For simplicity, FIG. 4 shows it as a synchronous action. Coupon redemption service 424 validates, at 440, the coupon by verifying that all of the coupon settings apply (coupon identifier, domain name, expiry). Coupon redemption service 424 validates, at 442, the server transaction identifier by verifying that the server transaction identifier exists and the information associated with the transaction matches the promotion by interfacing with registry transaction validation service 444. Registry transaction validation service 444 comprises a service API provided by domain registry 430 to validate a registration (or any transaction) and to provide information back associated with it. Registry transaction validation service 444 only validates the existence of the transaction and provides back transaction information to coupon redemption service 424 for comparison to the promotion. Coupon redemption service 424 applies, at 446, the promotion credit to the account of registrar 412 in account database 448. Providing the credit to registrant 416 can be covered via a contractual arrangement between the registrar 412 and the registrant 416. This can include updating the status of the coupon in coupon database 410 to reflect that it has been redeemed. Coupon redemption service 424 returns, at 450, the result of the coupon redemption to registrar 412, which may include the information like the result code (success, failure), the credit amount applied, and the date and time the credit was applied. Registrar 412 returns, at 452, the result of the registration request with using the coupon to registrant 416.

Figure 5:
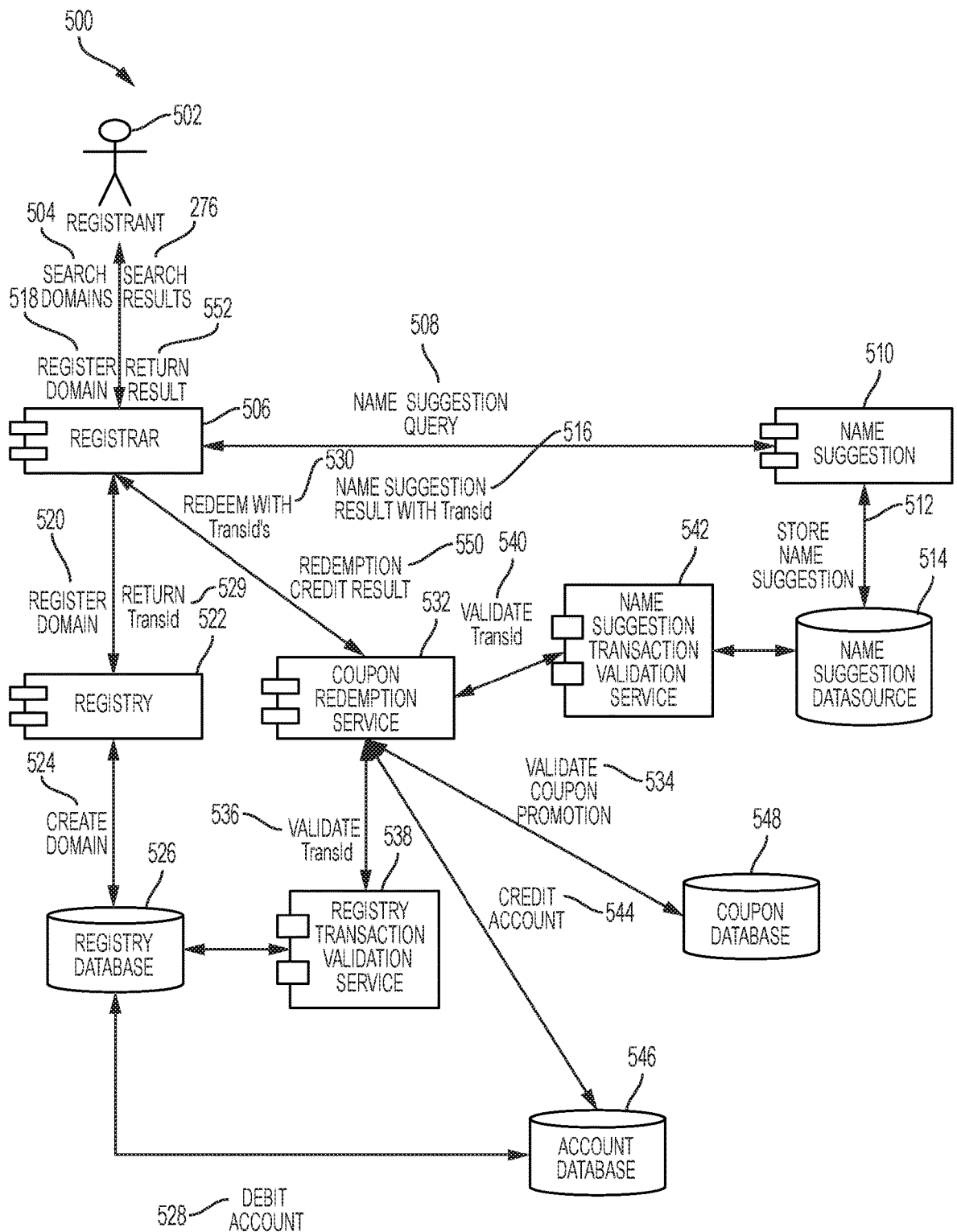
FIG. 5 shows a hybrid diagram 500 for a name suggestion registrar conversion method, according to examples of the present disclosure.

FIG. 5 shows a hybrid diagram 500 for a name suggestion registrar conversion method, according to examples of the present disclosure. The name suggestion registrar conversion method describes a name suggestion promotion that is associated with a name suggestion response to a registrar with a matching registration in the domain registry, which is referred to as a conversion. The name suggestion promotion can apply to any set of TLD's operated by the DNS registry, can be further refined to apply to a subset of the TLD's, a subset of the domain name (IDN, non-IDN, premium, standard), a subset of the registrars (e.g., based on location), and a subset of the registration periods. In the method of FIG. 5, it is assumed that the promotion has already been preconfigured into the coupon promotion service and the method describe how the name suggestion conversion credits are redeemed. In the method of FIG. 5, all credits are applied to the registrar. In some examples, registrant 502 can communicate with name suggestion service 510 prior to communicating with registrar 506 and provide the domain name from name suggestion service 510 to registrar 506.

Although not shown in FIG. 5, a coupon promotion service can be provided on a common server platform and can include coupon redemption service 532, which is in communication with coupon database 548.

Registrant 502 can search for available domains via registrar through use of name suggestion service. Registrant 502 interfaces, at 504, with registrar 506 to get an available domain name. Registrar 506 queries, at 508, name suggestion service 510 for domain name suggestions. Name suggestion service 510 stores, at 512, the suggestion information (suggested domains and server transaction identifier) on name suggestion datasource 514 (e.g., logs, database) for later conversion queries. Name suggestion service 510 returns, at 516, the suggestions back to registrar 506, which are displayed to registrant 502, along with the server transaction identifier. Registrar 506 will hold the server transaction identifier for use in receiving the conversion credit. Registrant 502 requests, at 518, to register a domain name with registrar 506 based on selecting one of the suggested domain names. Registrar 506 submits, at 520, the domain name registration (e.g., Domain Create Command as depicted in RFC 5731) to domain registry 522. Domain registry 522 creates, at 524, the domain name in registry database 526. A unique server transaction identifier is generated and stored for later use. Domain registry 522 debits, at 528, the account for registrar 506 with account database 546. Domain registry 522 returns, at 529, the registration response with a unique server transaction identifier to registrar 506. Registrar 506 will hold the server transaction identifier for use in receiving the conversion credit. Registrar 506 submits, at 530, the name suggestion server transaction identifier and the registration server transaction identifier to coupon redemption service 532 to receive the conversion credit. Coupon redemption service 532 comprises a specific API of the coupon promotion service for redemption of name suggestion conversion credits. In some examples, this may not be a synchronous call, meaning that a conversion redemption request will be submitted and registrar 506 will receive notification of the result. For simplicity, FIG. 5 shows this as a synchronous action. Coupon redemption service 532 validates, at 534, the name suggestion conversion promotion (e.g., derived coupon) by validating the domain name, the registration period, the transaction dates, and registrar 506 with the promotion. Coupon redemption service 532 validates, at 536, the registration server transaction identifier by verifying that the server transaction identifier exists and the information associated with the transaction matches the promotion by interfacing with registry transaction validation service 538. Registry transaction validation service 538 comprises a service API provided by domain registry 522 to validate a server transaction identifier and to provide information back associated with it. Registry transaction validation service 538 only validates the existence of the transaction and provides back transaction information to coupon redemption service 532 for comparison to the promotion. Coupon redemption service 532 validates, at 540, the suggestion server transaction identifier by verifying that the server transaction identifier exists and the information associated with the transaction matches the promotion by interfacing with name suggestion transaction validation service 542. Name suggestion transaction validation service 542 comprises a service API provided by name suggestion service 510 to validate a server transaction identifier and the domain name to confirm that the domain name registration was provided as part of a suggestion and the registration occurred after the suggestion. Name suggestion transaction validation service 542 only validates the existence of the transaction and provides back transaction information to coupon redemption service 532 for comparison to the promotion. Coupon redemption service 532 applies, at 544, the conversion promotion credit to the account of registrar 506 in account database 546. This can include updating the status of the conversion (e.g., derived coupon) in coupon database 548 to reflect that it has been redeemed. Coupon database 548 is a data source that stores the promotions and coupon redemption information. Coupon redemption service 532 returns, at 550, the result of the conversion redemption to registrar 506, which may include the information like the result code (success, failure), the credit amount applied, and the date and time the credit was applied. Registrar 506 returns, at 552, the result of the registration request to registrant 502.

Figure 6:
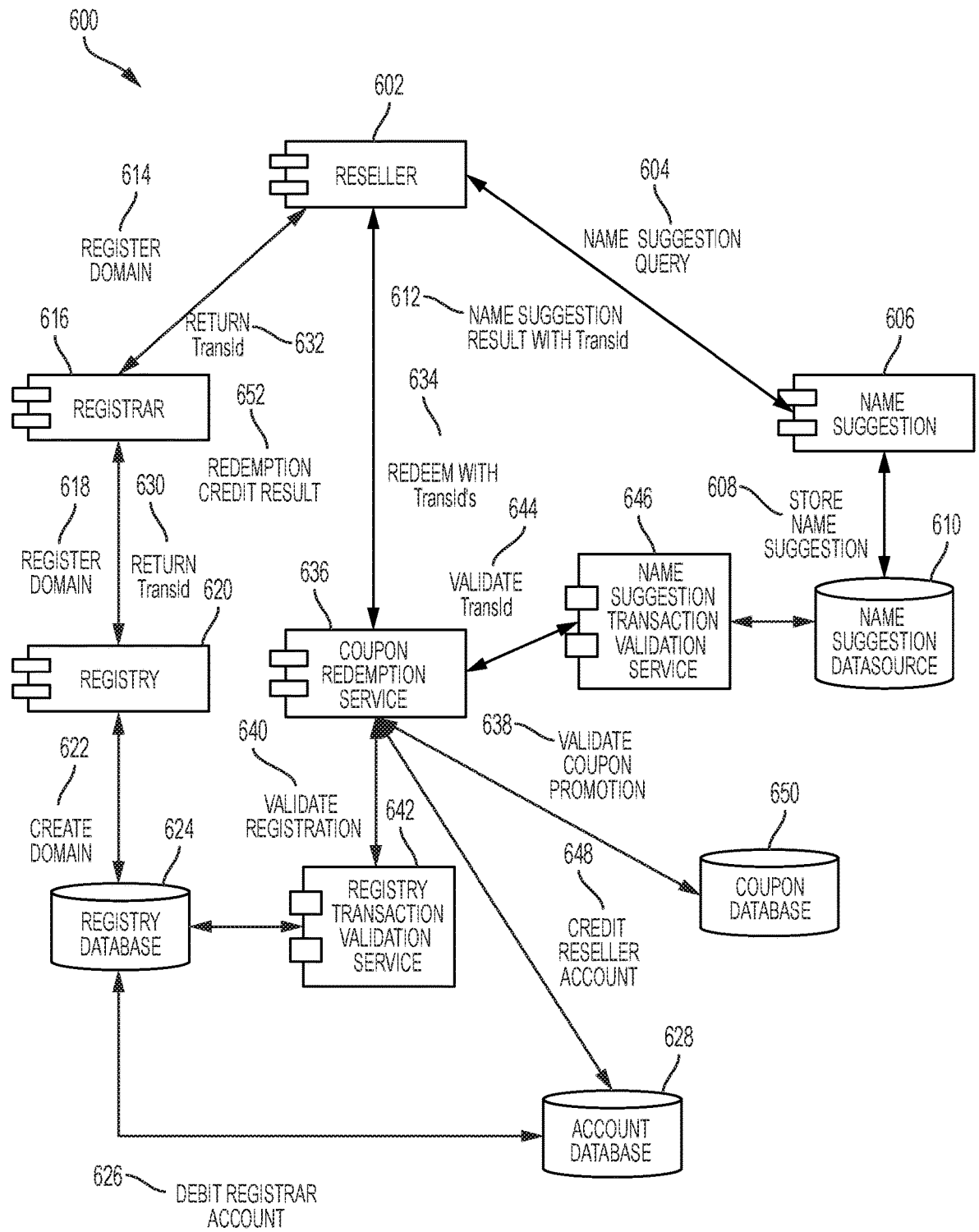
FIG. 6 shows a hybrid diagram 600 for a name suggestion reseller conversion with transid method, according to examples of the present disclosure.

FIG. 6 shows a hybrid diagram 600 for a name suggestion reseller conversion with transaction id (transid) method, according to examples of the present disclosure. The name suggestion reseller conversion with transid method describes a name suggestion promotion that is associated with a name suggestion response to a reseller with a matching registration in the domain registry, which is referred to as a conversion. The name suggestion promotion can apply to any set of TLD's operated by the DNS registry, can be further refined to apply to a subset of the TLD's, a subset of the domain name (IDN, non-IDN, premium, standard), a subset of the resellers (e.g., based on location or based on registrar), and a subset of the registration periods. In FIG. 6, it is assumed that the promotion has already been pre-configured into the coupon promotion service and the method describes how the name suggestion conversion credits are redeemed. The registration debit is applied to the registrar's account and the promotion credit is applied to the reseller's account. The key dependency for the name suggestion reseller conversion is for the registrar to provide the registration server transaction identifier generated by the registry back to the reseller.

Figure 7:
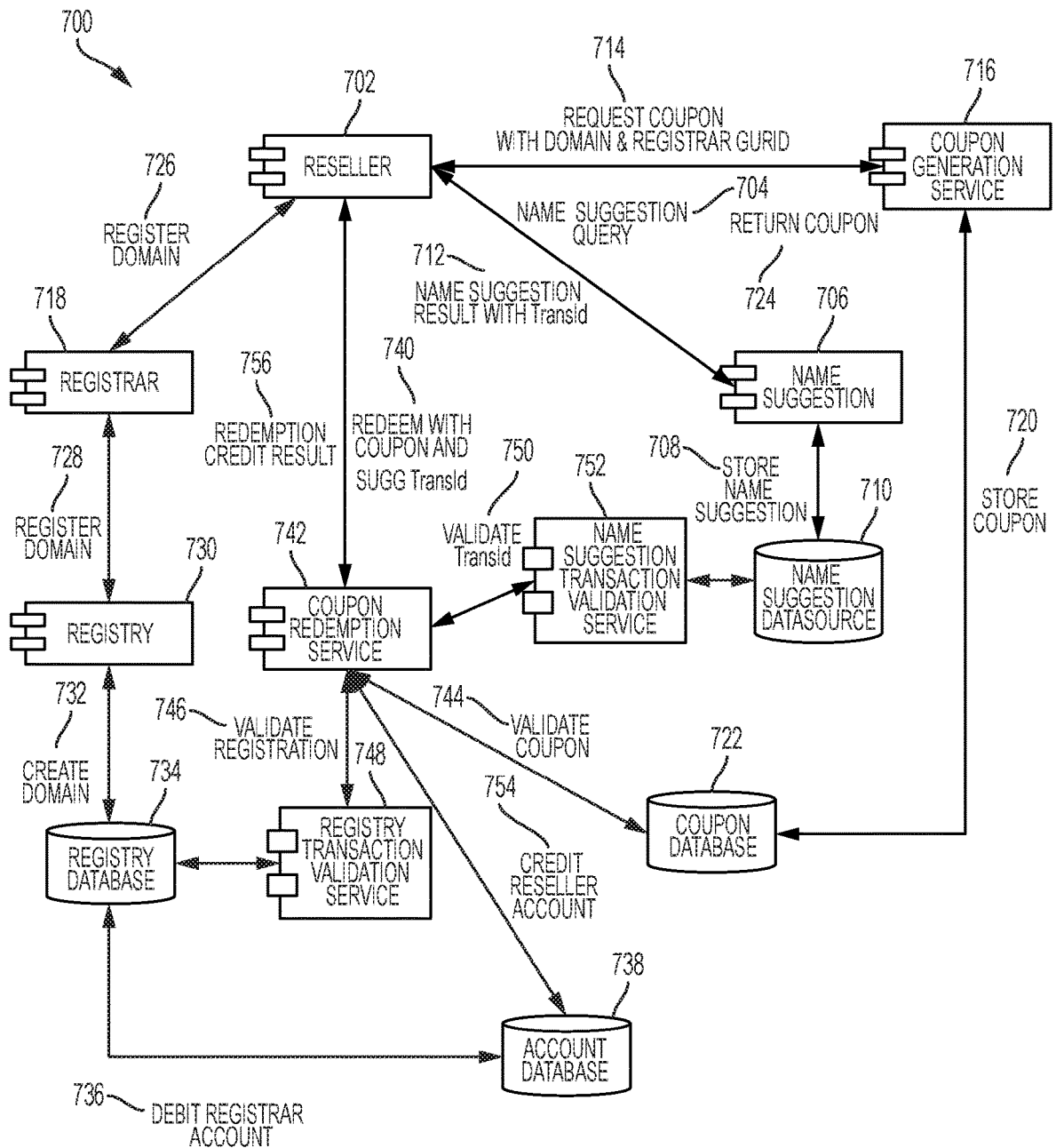
FIG. 7 shows a hybrid diagram 700 for a name suggestion reseller conversion with coupon method, according to examples of the present disclosure.

Reseller 602 queries, at 604, name suggestion service 606 for domain name suggestions. Name suggestion 606 stores, at 608, the suggestion information (suggested domains and server transaction identifier) on name suggestion datasource 610 (e.g., logs, database) for later conversion queries. Name suggestion 606 returns, at 612, the suggestions back to reseller 602 along with the server transaction identifier. Reseller 602 will hold the server transaction identifier for use in receiving the conversion credit. Reseller 602 submits, at 614, the registration request to registrar 616 via an API of reseller 602 of registrar 616. Registrar 616 submits, 618, the domain name registration (e.g., Domain Create Command in RFC 5731) to domain registry 620. Domain registry 620 creates, 622, the domain name in registry database 624. A unique server transaction identifier is generated and stored for later use. Domain registry 620 debits, at 626, the account of registrar 616 for the registration in account database 628. Domain registry 620 returns, at 630, the registration response with a unique server transaction identifier to registrar 616. Registrar 616 returns, 632, the unique server transaction identifier to reseller 602. Reseller 602 will hold the server transaction identifier for use in receiving the conversion credit. This is the key dependency of supporting resellers with a high level of conversion accuracy. Another alternative is described in the name suggestion reseller conversion with coupon use case as shown in FIG. 7. Reseller 602 submits, at 634, the name suggestion server transaction identifier and the registration server transaction identifier to coupon redemption service 636 to receive the conversion credit. In some examples, this may not be a synchronous call, meaning that a conversion redemption request will be submitted and reseller 602 will receive notification of the result. For simplicity, FIG. 6 shows this as a synchronous action. Coupon redemption service 636 validates, at 638, the name suggestion conversion promotion (e.g., derived coupon) by validating the domain name, the registration period, the transaction dates, and reseller 602 with the promotion. Coupon redemption service 636 validates, at 640, the registration server transaction identifier by verifying that the server transaction identifier exists and the information associated with the transaction matches the promotion by interfacing with registry transaction validation service 642. Registry transaction validation service 642 validates the existence of the transaction and provides back transaction information to coupon redemption service 636 for comparison to the promotion. Coupon redemption service 636 validates, at 644, the suggestion server transaction identifier by verifying that the server transaction identifier exists and the information associated with the transaction matches the promotion by interfacing with name suggestion transaction validation service 646. Name suggestion transaction validation service 646 validates the existence of the transaction and provides back transaction information to coupon redemption service 636 for comparison to the promotion. Coupon redemption service 636 applies, at 648, the conversion promotion credit to the account of reseller 602 in account database 628. This can include updating the status of the conversion (e.g., derived coupon) in coupon database 650 to reflect that it has been redeemed. Coupon redemption service 636 returns, at 652, the result of the conversion redemption to reseller 602, which may include the information like the result code (success, failure), the credit amount applied, and the date and time the credit was applied.

FIG. 7 shows a hybrid diagram 700 for a name suggestion reseller conversion with coupon method, according to examples of the present disclosure. The name suggestion reseller conversion with coupon use case is similar to the name suggestion reseller conversion with transid use case, with the difference with the name suggestion reseller conversion with coupon use case is that there is no dependency to the registry server transaction identifier, but there is the dependency for the reseller to explicitly create a coupon prior to submitting the registration to the registrar. If the registrar can expose the registry server transaction identifier to the reseller, then the name suggestion reseller conversion with transid use case can be used.

Reseller 702 queries, at 704, name suggestion service 706 for domain name suggestions. Name suggestion 706 stores, at 708, the suggestion information (suggested domains and server transaction identifier) on name suggestion datasource 710 (e.g., logs, database) for later conversion queries. Name suggestion 706 returns, at 712, the suggestions back to reseller 702 along with the server transaction identifier. Reseller 702 will hold the server transaction identifier for use in receiving the conversion credit. Reseller 702 requests, at 714, for a coupon from coupon generation service 716 passing in the domain name and the GURID of registrar 718 that will be used. In some examples, each coupon promotion can have a unique handle that is referenced when requesting a coupon. Coupon generation service 716 will validate the coupon request, which may be based on a fixed number of coupons defined per reseller, will generate the coupon and will store, at 720, the coupon in coupon database 722. In some examples, there may be an expiry date/time for the coupon to be redeemed by reseller 702. 3. The coupon is returned, at 724, to reseller 702 by coupon generation service 716 for use in coupon redemption. Reseller 702 submits, 726, the registration request to registrar 718 via an API reseller 702 for registrar 718. Registrar 718 submits, at 728, the domain name registration (e.g., Domain Create Command as depicted in RFC 5731) to domain registry 730. Domain registry 730 creates, at 732, the domain name in registry database 734. Domain registry 730 debits, at 736, the account of registrar 718 for the registration in account database 738. Reseller 702 submits, at 740, the name suggestion server transaction identifier and the coupon to coupon redemption service 742 to receive the conversion credit. In some examples, this may not be a synchronous call, meaning that a conversion redemption request will be submitted and reseller 702 will receive notification of the result. For simplicity, FIG. 7 shows this is as a synchronous action. Coupon redemption service 742 validates, at 744, that the coupon exists and that the coupon attributes match (GURID of registrar 718, domain name). Coupon redemption service 742 validates, at 746, the registration by verifying that the domain name was registered after the coupon was created and was done by the specified registrar GURID. Registry transaction validation service 748 only validates the existence of the transaction and provides back transaction information to coupon redemption service 742 for comparison to the promotion. Coupon redemption service 742 validates, at 750, the suggestion server transaction identifier by verifying that the server transaction identifier exists and the information associated with the transaction matches the promotion by interfacing with name suggestion transaction validation service 752. Name suggestion transaction validation service 752 only validates the existence of the transaction and provides back transaction information to coupon redemption service 742 for comparison to the promotion. Coupon redemption service 742 applies, at 754, the conversion promotion credit to the account of reseller 702 in account database 738. This can include updating the status of the conversion (e.g., derived coupon) in coupon database 722 to reflect that it has been redeemed. Coupon redemption service 742 returns, at 756, the result of the conversion redemption to reseller 702, which may include the information like the result code (success, failure), the credit amount applied, and the date and time the credit was applied.

The example shown in FIGS. 6 and 7 can apply for multiple layers of resellers. The example of FIG. 7 can provide a name suggestion conversion credit, since there is no dependency for data (server transaction identifier) to be pass up through the channel from the registry. Reseller 702 can have a reseller customer or even an n-tier reseller that can interface with the coupon generation service and the coupon redemption service in the same way, but the reseller customer or the n-tier reseller would need to know the GURID (IANA ID) of the registrar that will be used for the registration.

Figure 8:
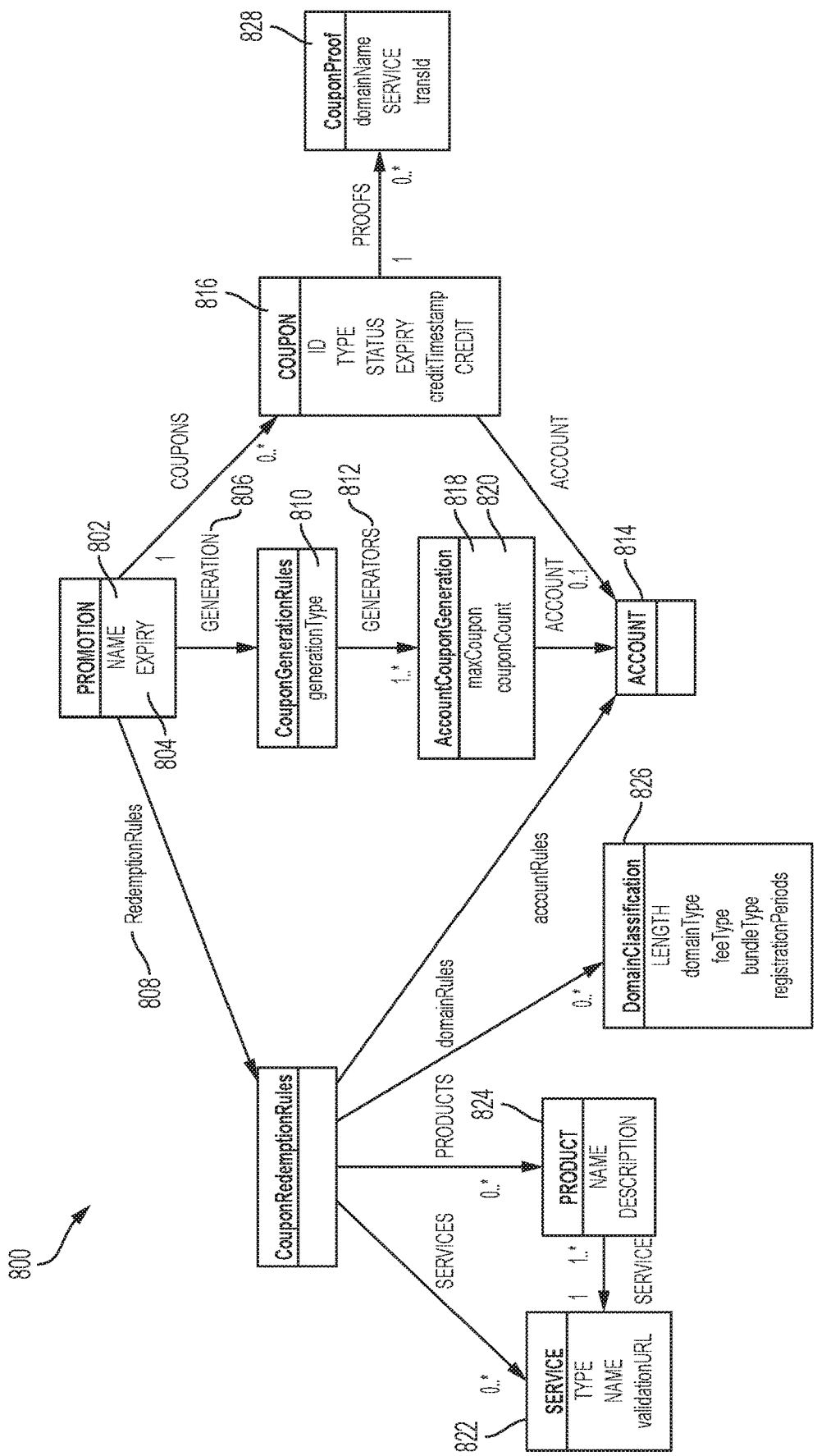
FIG. 8 shows a promotion class diagram 800 that can be used as a model for defining a promotion, according to examples of the present disclosure.

FIG. 8 shows a promotion class diagram 800 that can be used as a model for defining a promotion, according to examples of the present disclosure. The promotion comprises attributes including name 802, e.g., a unique name, expiry 804 that is an expiration date for an end of the promotion (a promotion may not have an expiry value), generation 806, redemption rules 808. Generation 806 includes rules that define how coupons are created based on an enumerated generationType 810 and a list of generators 812 that include what accounts 814 (internal or external) that can generate coupons 816 along with a policy that defines the maximum number of coupons to generate, e.g., maxCoupons 818, and a current couponCount 820. This can be expanded to include time elements like maxCouponsPerDay or maxCouponsPerMonth or maxCouponsPerTime. The generation rules need to include who can generate, with what constraints, and what is the current generation state. Another element of the generation would be the credit that would be applied upon successful redemption.

Redemption rules 808 are the rules needed to be satisfied to receive a credit. These include service 822, which indicates what services must be used. Service 822 is directly related or indirectly related through product 824. Name suggestion is an example of a direct service, while a domain registry is an example of an indirect service that would be linked through one or more product. Service 822 includes an enumerated type (e.g., suggestion, registry), and unique name (e.g., core, ctld, name suggestion), and a validation-URL used to validate a proof. It is assumed that the validation service API is a RESTful API that is unique per service type. Other meta-data can be defined for the service to assist in interfacing with the validation service. Product 824, which indicates what product must be used, is typically associated with a TLD that in turn is associated with service 822.

DomainClassification 826 indicates one or more domain classification that must be satisfied to match the redemption rules. Examples of classifications including the domain length, the domain type (e.g., IDN or ASCII), the fee type (e.g., standard or premium), a bundle type (e.g., variant, TLD), and a list of registration periods. Additional classification can be defined like a list of operations, where it is assumed the operation is a registration (e.g., domain create), but other operations can be defined for products.

Account 814 indicates the account associated with the coupon. There may be no assigned account based on the status of the coupon. Coupons 816 indicates the persistent set of coupons that capture the following: id, which is the unique identifier for the coupon, type, which is the enumerated coupon type (e.g., pre-generated or derived), status, which is the status of the coupon that could be "created", "pending", "redeemed", and "expired", expiry, which is the expiry date and time of the coupon, creditTimestamp, which is the date and time that the credit was given, credit, which is the credit amount, and proofs 828, which is the list of proofs provided by the client to redeem the coupon. Proofs 828 includes: domainName, which is the domain name used in the transaction, service, which is the service transacted with, and transId, which is the server transaction identifier of the transaction.

Figure 9:
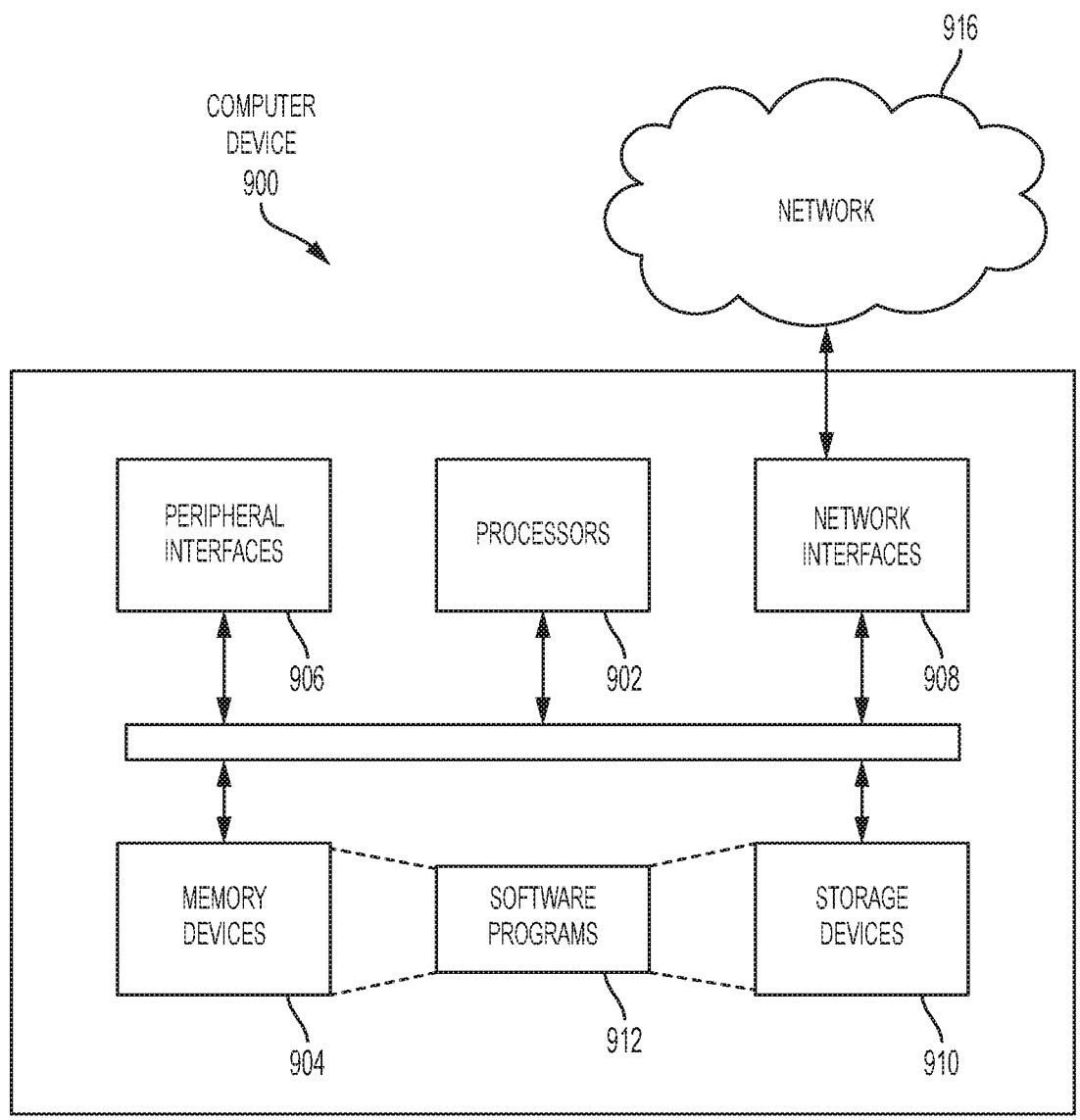
FIG. 9 illustrates an example of a hardware configuration for a computer device 900 that can be used as mobile device or server, which can be used to perform one or more of the processes described above.

FIG. 9 illustrates an example of a hardware configuration for a computer device 900 that can be used a client computer or a server, which can be used to perform one or more of the processes described above. While FIG. 9 illustrates various components contained in the computer device 900, FIG. 9 illustrates one example of a computer device and additional components can be added and existing components can be removed.

The computer device 900 can be any type of computer device, e.g., eligibility client 105, eligibility service 110, eligibility support service 130, the DNS registry, domain name suggestion service. As illustrated in FIG. 9, the computer device 900 can include one or more processors 902 of varying core configurations and clock frequencies. The computer device 900 can also include one or more memory devices 904 that serve as a main memory during the operation of the computer device 900. For example, during operation, a copy of the software that supports the DNS operations can be stored in the one or more memory devices 904. The computer device 900 can also include one or more peripheral interfaces 906, such as keyboards, mice, touchpads, computer screens, touchscreens, etc., for enabling human interaction with and manipulation of the computer device 900.

The computer device 900 can also include one or more network interfaces 908 for communicating via one or more networks, such as Ethernet adapters, wireless transceivers, or serial network components, for communicating over wired or wireless media using protocols. The computer device 900 can also include one or more storage device 910 of varying physical dimensions and storage capacities, such as flash drives, hard drives, random access memory, etc., for storing data, such as images, files, and program instructions for execution by the one or more processors 902.

Additionally, the computer device 900 can include one or more software programs 912 that enable the functionality described above. The one or more software programs 912 can include instructions that cause the one or more processors 902 to perform the processes described herein. Copies of the one or more software programs 912 can be stored in the one or more memory devices 904 and/or on in the one or more storage devices 910. Likewise, the data used by one or more software programs 912 can be stored in the one or more memory devices 904 and/or on in the one or more storage devices 910.

In implementations, the computer device 900 can communicate with other devices via a network 916. The other devices can be any types of devices as described above. The network 916 can be any type of electronic network, such as a local area network, a wide-area network, a virtual private network, the Internet, an intranet, an extranet, a public switched telephone network, an infrared network, a wireless network, and any combination thereof. The network 916 can support communications using any of a variety of commercially-available protocols, such as TCP/IP, UDP, OSI, FTP, UPnP, NFS, CIFS, AppleTalk, and the like. The network 916 can be, for example, a local area network, a wide-area network, a virtual private network, the Internet, an intranet, an extranet, a public switched telephone network, an infrared network, a wireless network, and any combination thereof.

The computer device 900 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 900 as described above need not be enclosed within a single enclosure or even located in close proximity to one another. Those skilled in the art will appreciate that the above-described componentry are examples only, as the computer device 900 can include any type of hardware componentry, including any necessary accompanying firmware or software, for performing the disclosed implementations. The computer device 900 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

The invention claimed is:

1. A method of providing promotion domain name system ("DNS") eligibility comprising:
   obtaining, at an eligibility service comprising at least one electronic server computer communicatively coupled to a computer network, a request for a promotion proof from a DNS client;
   validating, by the eligibility service, the request for the promotion proof;
   providing, by the eligibility service, the promotion proof to the DNS client;
   obtaining from the DNS client, by the eligibility service, an eligibility proof for the promotion, wherein the eligibility proof is related to a registration of a domain name by the DNS client with a DNS registry;
   validating, by the eligibility service, the eligibility proof for the promotion and the coupon;
   applying, by the eligibility service, a promotion credit to an account of the DNS client; and
   providing, by the eligibility service, a confirmation of the promotion credit to the DNS client.

2. The method of claim 1, wherein obtaining the eligibility proof further comprises obtaining an identifier related to the registration of the domain name.

3. The method of claim 2, further comprising validating, by the eligibility service, the identifier.

4. The method of claim 2, wherein the identifier related to registration of the domain name is a unique server transaction identifier created by the DNS registry.

5. The method of claim 1, wherein the eligibility proof comprises a code, a token, or a coupon.

6. The method of claim 1, wherein the eligibility proof is pre- generated and associated with a domain name registration promotion.

7. The method of claim 1, wherein the DNS client comprises a DNS registrar, DNS registrant, a DNS reseller, a n-tier DNS reseller, or a DNS reseller customer.

8. The method of claim 1, wherein the eligibility service comprises a service provided by a DNS registry or a domain name suggestion service provider.

9. A promotion eligibility computer system comprising:
   an electronic processor;
   a non-transitory computer readable medium configured to store instructions that when executed by the electronic processor performs a method of providing domain name system ("DNS") promotion eligibility comprising:
   obtaining a request for a promotion proof from a DNS client;
   validating the request for the promotion proof;
   providing the promotion proof to the DNS client;
   obtaining an eligibility proof for the promotion from the DNS client, wherein the eligibility proof is related to a registration of a domain name by the DNS client with a DNS registry;
   validating the eligibility proof for the promotion;
   applying a promotion credit to an account of the DNS client; and
   providing a confirmation of the promotion credit to the DNS client.

10. The eligibility computer system of claim 9, wherein obtaining the eligibility proof further comprises obtaining an identifier related to the registration of the domain name.

11. The eligibility computer system of claim 10, wherein the electronic processor is configured to execute the method further comprising validating the identifier.

12. The eligibility computer system of claim 10, wherein the identifier related to registration of the domain name is a unique server transaction identifier created by the DNS registry.

13. The eligibility computer system of claim 9, wherein the eligibility proof comprises a code, a token, or a coupon.

14. The eligibility computer system of claim 9, wherein the eligibility proof is pre-generated and associated with a domain name registration promotion.

15. The eligibility computer system of claim 9, wherein the DNS client comprises a DNS registrar, DNS registrant, a DNS reseller, a n-tier DNS reseller, or a DNS reseller customer.

16. The eligibility computer system of claim 9, wherein the eligibility service comprises a service provided by a DNS registry or a domain name suggestion service provider.

17. A non-transitory computer readable medium configured to store instructions that when executed by an electronic processor configured to perform a method of providing domain name system ("DNS") promotion eligibility comprising:
   obtaining a request for a promotion proof from a DNS client;
   validating the request for the promotion proof;
   providing the proof promotion proof to the DNS client;
   obtaining an eligibility proof for the promotion from the DNS client, wherein the eligibility proof is related to a registration of a domain name by the DNS client with a DNS registry;
   validating the eligibility proof for the promotion;
   applying a promotion credit to an account of the DNS client; and
   providing a confirmation of the promotion credit to the DNS client.

18. The non-transitory computer readable medium of claim 17, wherein obtaining the eligibility proof further comprises obtaining an identifier related to the registration of the domain name.

19. The non-transitory computer readable medium of claim 18, wherein the electronic processor is configured to execute the method further comprising validating the identifier.

20. The non-transitory computer readable medium of claim 18, wherein the identifier related to registration of the domain name is a unique server transaction identifier created by the DNS registry.

* * * * *

UNITED STATES PATENT AND TRADEMARK OFFICE
CERTIFICATE OF CORRECTION

PATENT NO. : 11,171,917 B2
APPLICATION NO. : 15/800557
DATED : November 9, 2021
INVENTOR(S) : James Gould et al.

Page 1 of 1

It is certified that error appears in the above-identified patent and that said Letters Patent is hereby corrected as shown below:

In the Claims

In Claim 1, Column 17, Line 50, the words "and the coupon" should be deleted.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*